(12) United States Patent
Ling et al.

(10) Patent No.: US 12,254,712 B2
(45) Date of Patent: Mar. 18, 2025

(54) MONOCULAR UNDERWATER CAMERA BIOMASS ESTIMATION

(71) Applicant: TidalX AI Inc, San Ramon, CA (US)

(72) Inventors: Julia Black Ling, Redwood City, CA (US); Laura Valentine Chrobak, Menlo Park, CA (US)

(73) Assignee: TidalX AI Inc., Mountain View, CA (US)

( * ) Notice: Subject to any disclaimer, the term of this patent is extended or adjusted under 35 U.S.C. 154(b) by 525 days.

(21) Appl. No.: 17/716,797

(22) Filed: Apr. 8, 2022

(65) Prior Publication Data

US 2023/0326226 A1    Oct. 12, 2023

(51) Int. Cl.
*G06V 40/10* (2022.01)
*G06Q 50/02* (2024.01)
*G06T 7/62* (2017.01)

(52) U.S. Cl.
CPC ............... *G06V 40/10* (2022.01); *G06T 7/62* (2017.01); *G06Q 50/02* (2013.01)

(58) Field of Classification Search
CPC ...... G06V 40/10; G06V 20/653; G06V 20/05; G06V 10/82; G06V 10/454; G06V 10/764; G06V 10/25; G06V 20/58; G06T 7/62; G06T 2207/20081; G06T 7/0012; G06T 7/50; G06T 7/73; G06T 2207/20084; G06T 2207/30168; G06T 7/11; G06T 7/20; G06T 2207/10028; G06T 2207/10016; G06Q 50/02; G06N 3/045; G06N 3/08; G06N 20/00; G06N 3/04; G06N 3/082; G06N 5/046; A01K 61/95; A01K 61/60; A01K 61/80; A01K 29/005; A01K 61/10; A01K 61/13; A01K 29/00
See application file for complete search history.

(56) References Cited

U.S. PATENT DOCUMENTS 10,191,489 B1 * 1/2019 Rapoport ............. G05D 1/0692
10,856,520 B1 * 12/2020 Kozachenok .......... A01K 61/80
11,244,191 B2 * 2/2022 Yao ........................ G06F 18/214
(Continued)

FOREIGN PATENT DOCUMENTS

WO   WO-2019232247 A1 * 12/2019 ............. A01K 61/13
WO   WO 2022010815         1/2022

OTHER PUBLICATIONS

International Search Report and Written Opinion in International Appln. No. PCT/US2023/017970, dated Sep. 25, 2023, 18 pages.
(Continued)

*Primary Examiner* — Michael S Osinski
(74) *Attorney, Agent, or Firm* — Fish & Richardson P.C.

(57) ABSTRACT

Methods, systems, and apparatus, including computer programs encoded on computer-storage media, for monocular underwater camera biomass estimation. In some implementations, an exemplary method includes obtaining an image of a fish captured by a monocular underwater camera; providing the image of the fish to a depth perception model; obtaining output of the depth perception model indicating a depth-enhanced image of the fish data in the image; determining a biomass value estimate of the fish based on the output; and determining an action based on one or more biomass values estimates including the biomass value estimate of the fish.

20 Claims, 4 Drawing Sheets

(56) References Cited

U.S. PATENT DOCUMENTS

| | | | | |
|---|---|---|---|---|
| 2004/0199275 | A1* | 10/2004 | Berckmans | A01K 5/02 700/90 |
| 2006/0018197 | A1* | 1/2006 | Burczynski | A01K 61/95 367/87 |
| 2011/0196661 | A1* | 8/2011 | Spicola | A01K 29/00 703/11 |
| 2013/0223693 | A1* | 8/2013 | Chamberlain | A01K 73/10 382/110 |
| 2018/0289334 | A1* | 10/2018 | De Brouwer | A61B 5/1032 |
| 2018/0365246 | A1* | 12/2018 | Laster | A01K 61/95 |
| 2019/0228218 | A1* | 7/2019 | James | G06T 7/593 |
| 2019/0340440 | A1* | 11/2019 | Atwater | A01K 61/60 |
| 2020/0113158 | A1* | 4/2020 | Rishi | G06T 7/20 |
| 2020/0175700 | A1* | 6/2020 | Zhang | G06V 10/26 |
| 2020/0202542 | A1* | 6/2020 | Takhirov | G06V 10/454 |
| 2020/0288678 | A1* | 9/2020 | Howe | G06F 18/21 |
| 2020/0372265 | A1* | 11/2020 | Ko | G06V 10/82 |
| 2021/0150747 | A1* | 5/2021 | Liu | G06T 5/50 |
| 2021/0183052 | A1* | 6/2021 | Ikeda | G06T 7/90 |
| 2021/0192187 | A1* | 6/2021 | Kim | G06V 40/165 |
| 2021/0319578 | A1* | 10/2021 | Casser | G06N 3/088 |
| 2021/0321593 | A1* | 10/2021 | Ma | H04N 13/296 |
| 2021/0368748 | A1 | 12/2021 | Barnaby et al. | |
| 2022/0000079 | A1 | 1/2022 | Ming et al. | |
| 2022/0230310 | A1* | 7/2022 | Xie | G06T 7/174 |
| 2022/0398704 | A1* | 12/2022 | Sun | G06T 5/30 |
| 2023/0337636 | A1* | 10/2023 | Shmigelsky | G06V 10/25 |

OTHER PUBLICATIONS

International Invitation to Pay Additional Fees in International Appln. No. PCT/US2023/017970, dated Aug. 2, 2023, 13 pages.
International Preliminary Report on Patentability in International Appln. No. PCT/US2023/017970, dated Oct. 8, 2024, 11 pages.

* cited by examiner

MONOCULAR UNDERWATER CAMERA BIOMASS ESTIMATION

FIELD

This specification generally relates to biomass estimation, particularly those that are used for aquatic livestock.

BACKGROUND

A population of farmed fish may include fish of varying sizes, shapes, and health conditions. In the aquaculture context, prior to harvesting, a worker may remove some fish from the fish pen and weigh them. The manual process of removing the fish from the fish pen and weighing them is both time intensive and potentially harmful to the fish. In addition, because only a small portion of a fish population may be effectively measured in this way, the true characteristics of the population remain unknown.

SUMMARY

In general, innovative aspects of the subject matter described in this specification relate to estimating the biomass of aquatic livestock. Individual fish can be photographed using a single underwater camera. A single image from the underwater camera can be processed using computer vision and machine learning-based techniques to identify fish within the images and to determine features, e.g., truss lengths, on the fish. Biomass estimations for individual fish are generated by a model (e.g., neural network, Random Forest Regressor, Support Vector Regressor, or Gaussian Process Regressor, among others) that is trained to generate predicted biomass based, e.g., on truss lengths. The biomass of fish populations may be used to control the amount of feed given to a fish population, e.g., by controlling a feed distribution system, as well as to identify and isolate runt, diseased, or other sub-populations.

One innovative aspect of the subject matter described in this specification is embodied in a method that includes obtaining an image of a fish captured by a monocular underwater camera; providing the image of the fish to a depth perception model; obtaining output of the depth perception model indicating a depth-enhanced image of the fish; determining a biomass estimate of the fish based on the output; and determining an action based on one or more biomass estimates including the biomass estimate of the fish.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include determining, based on the depth-enhanced image of the fish, a data set including a value that indicates a length between a first point on the fish and a second point on the fish.

In some implementations, actions include determining the biomass value of the fish includes providing the data set including the value that indicates the length between the first point on the fish and the second point on the fish to a model trained to predict biomass; and obtaining output of the model trained to predict biomass as the biomass value of the fish.

In some implementations, actions include detecting the first point and second point on the fish. In some implementations, detecting the points includes providing the depth-enhanced image of the fish to a model trained to detect feature points on a fish body.

In some implementations, actions include detecting the fish within the image using a model trained to detect fish.

In some implementations, the action includes adjusting a feeding system providing feed to the fish.

In some implementations, the action includes sending data including the biomass estimate to a user device, where the data is configured to, when displayed on the user device, present a user of the user device with a visual representation of the biomass estimate.

In some implementations, actions include obtaining data from the monocular underwater camera indicating a current operation status of the monocular underwater camera; and in response to obtaining the image of the fish and the data from the monocular underwater camera, providing the image of the fish to the depth perception model.

An advantage of the methods, systems, and apparatuses described herein includes reducing reliance on hardware for obtaining depth data from an environment such as hardware for stereo cameras, light based depth detection, among others. When a setup of stereo cameras is used, depth information can be determined from the visual differences of objects captured by the two or more cameras of the stereo camera setup. However, if a stereo camera setup is damaged, is partially obscured, or is partially made non-functional, processes that rely on depth information of the stereo camera may not function properly. Similarly, stereo camera setups generally are more expensive to produce, calibrate, and maintain than single camera equivalents. Stereo camera setups can also be less efficient by requiring greater amounts of image data to be transferred to processing elements compared to single camera equivalents.

Solutions described herein specify the use of a depth perception model to determine depth based solely on a 2-dimensional image of a single camera without depth data. Other possible solutions, such as a time of flight (ToF) sensor present further issues, including environmental effects, that can affect accuracy. For example, ToF sensors or other depth sensors can detect debris within an environment, such as water, as objects for distance measurement. The variable debris in the environment can similarly present issues in determining a correlation of time for reflection and actual distance as the time may depend on the amount of debris in the environment.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
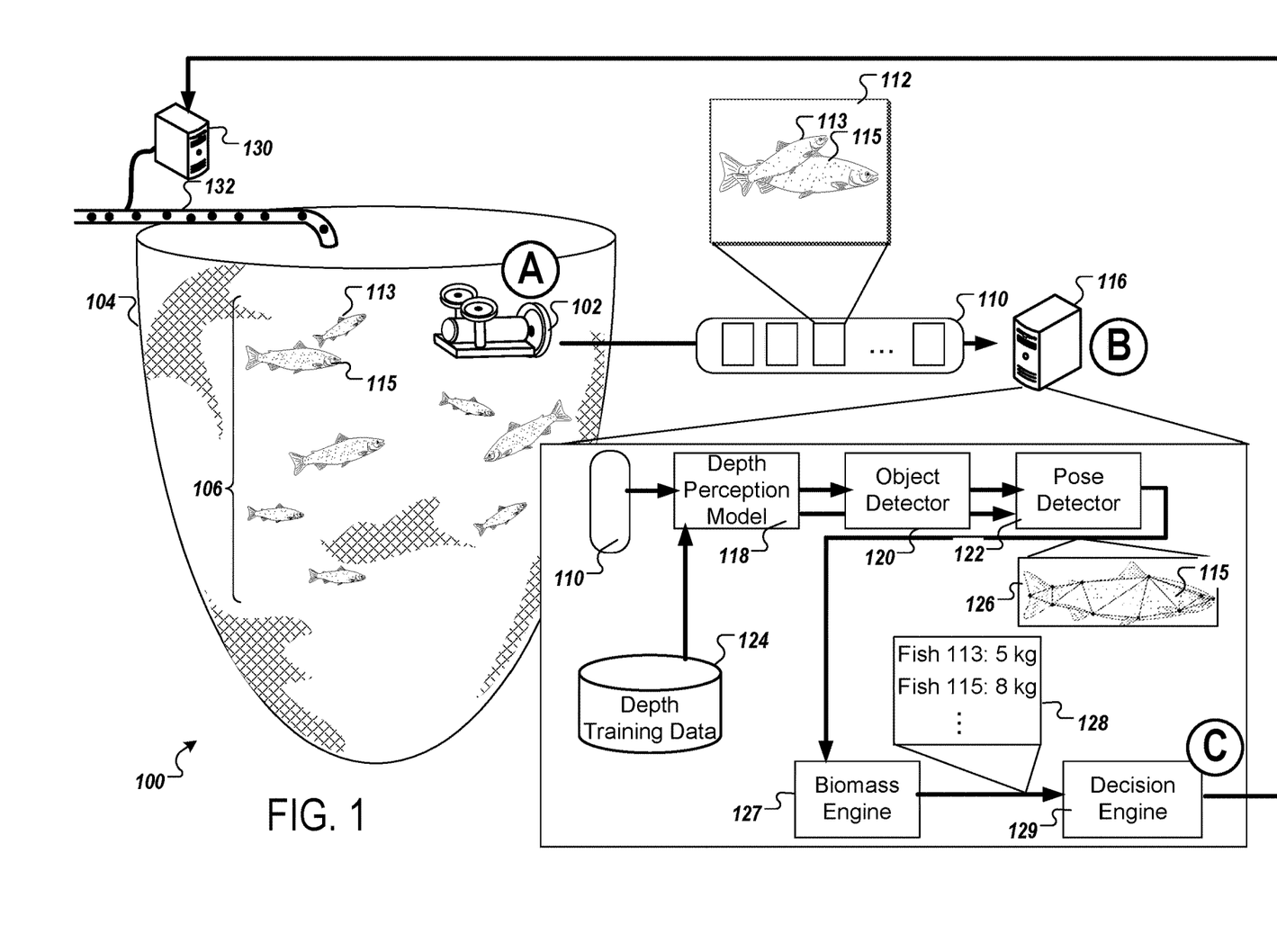
FIG. 1 is a diagram showing an example of a system that is used for monocular underwater camera biomass estimation.

FIG. 1 is a diagram showing an example of a system 100 that is used for underwater camera biomass estimation. The system 100 includes a control unit 116 and an underwater camera device 102. Generally speaking, the control unit 116 obtains images captured by a camera of the camera device 102 and processes the images to generate biomass estimations for one or more fish. The biomass estimations for one or more fish can be processed to determine actions such as feed adjustment, sorting, model training, and user report feedback, among others.

At least one of the one or more cameras of the camera device 102 includes a camera that captures images from a single viewpoint at a time. This type of camera may be referred to as a monocular camera. Where a stereo camera setup can include multiple cameras each capturing a unique viewpoint at a particular time, a monocular camera captures one viewpoint at a particular time. A computer processing output of a stereo camera setup can determine, based on differences in the appearance of objects in one viewpoint compared to another viewpoint at a particular time, depth information of the objects.

In some implementations, the camera device 102 has one or more cameras in a stereo camera setup that are non-functional or obscured, e.g., by debris or other objects, including fish or other animals, in an environment. In some implementations, the control unit 116 can process one or more images from the camera device 102, or obtain a signal from the camera device 102, indicating that one or more cameras of the camera device 102 are obscured or non-functional or the camera device 102 is operating with a monocular camera. The control unit 116 can adjust a processing method based on the status of the cameras of the camera device 102, such as a stereo setup status or a monocular camera setup status.

In some implementations, the camera device 102 includes a single camera. For example, the single camera can be a monocular camera that captures a single viewpoint at a time. In some implementations, the camera device 102 with a single camera is more efficient to produce and maintain, more economical, and can be more robust with fewer components prone to failure.

The system 100 also includes a feed controller unit 130 that controls the feed delivered by feed system 132. The feed controller unit 130 can include components configured to send control messages to actuators, blowers, conveyers, switches, or other components of the feed system 132. The control messages can be configured to stop, start, or change a meal provided to fish 106 in pen 104.

In this example, the camera device 102 includes propellers to move the camera device 102 around the fish pen 104. In general, the camera device 102 may use any method of movement including ropes and winches, waterjets, thrusters, tethers, buoyancy control apparatus, chains, among others.

In some implementations, the camera device 102 is equipped with the control unit 116 as an onboard component, while in other implementations, the control unit 116 is not affixed to the camera device 102 and is external to the camera device 102. For example, the camera device 102 may provide images 112 and 114 over a network to the control unit 116. Similarly, the control unit 116 can provide return data, including movement commands to the camera device 102 over the network.

Stages A through C of FIG. 1, depict image data 110, including image 112, obtained by the camera device 102 that are processed by the control unit 116. The image 112 includes representations of the fish 113 and 115. Although image 112 shows the fish 113 and 115 in a side profile view, images of fish obtained by the camera device 102 may include fish in any conceivable pose including head on, reverse head on, or skewed.

In stage A, the camera device 102 obtains the image data 110 including image 112 of the fish 113 and 115 within the pen 104. The camera device 102 provides the data 110 to the control unit 116.

In stage B, the control, unit 116 processes the images of the data 110, including the image 112. The control unit 116 provides the data 110 to the depth perception model 118. In some implementations, the depth perception model 118 is trained using the depth training data 124. For example, the depth training data 124 can include images of one or more fish in an environment. The depth training data 124 can include information of features of the one or more fish and distance to the camera for each of the features. For example, for a head on image of a fish, the depth training data 124 can include a distance to the camera of a head of a fish that is smaller than a distance to the camera of a side fin of the fish.

In some implementations, the depth perception model 118 includes one or more fully or partially connected layers. Each of the layers can include one or more parameter values indicating an output of the layers. The layers of the depth perception model 118 can generate output indicating depth information of an image, such as the image 112.

In some implementations, the control unit 116 trains the depth perception model 118. For example, the control unit 116 can provide the depth training data 124 to the depth perception model 118. The depth training data 124 can include ground truth data indicating depths of features within an environment. The depth perception model 118 can generate an estimation of depths within an image. The control unit 116 can compare the estimations of the depth perception model 118 to ground truth data of the depth training data 124. Based on the comparison, the control unit 116 can adjust one or more parameters of the depth perception model 118 to adjust a subsequent output of the depth perception model 118.

The control unit 116 provides output of the depth perception model 118 to the object detector 120. The object detector 120 obtains the output. The output can include a depth enhanced image of the fish 115. The output can include a depth enhanced image of objects depicted in the image 112, including the fish 113 and the fish 115. The output can include depth enhanced versions of one or more images of the data 110.

In some implementations, the depth-enhanced versions of the one or more images of the data 110 improve detection of the object detector 120. For example, the object detector 120 can determine, based on a depth-enhanced version of an image, a distance to a feature depicted in the image. The feature may represent a fish far away from the camera device 102. Without depth information, the object detector 120 may misdetect the fish as a piece of debris. Based on the depth-enhanced versions of images, the object detector 120 can provide more accurate identifications of objects. For example, the size and shape of fish can help identify the species and other attributes of a fish. By processing a depth-enhanced version of an image, the object detector 120 can more accurately identify fish based on a determination of the actual size of the features represented by an image.

In some implementations, the depth-enhanced versions of the one or more images of the data 110 improve detection of the pose detector 122. For example, depth data of a depth-enhanced version of an image can provide sufficient data for the pose detector 122 to determine a relationship between a distance to the camera 102 for one or more parts on a fish, such as the fish 115. The pose detector 122 can determine that the tail of the fish is more or less close compared to a nose of the fish. Such a position can distort a corresponding truss network where the lengths appear to be shorter based on the angle of the fish. Using the depth-enhanced version of an image, the pose detector 122 can determine such a pose with accuracy resulting in more accurate truss network generation and biomass estimation compared to estimating the pose based solely on visual appearance of the fish. For example, a slight angle in pose may not result in detectable visual features in the image potentially resulting in a truss network, generated without depth data, that represents a smaller fish than reality. However, with a depth-enhanced version of an image, the pose can be detected with accuracy even at relatively small angles.

In general, the control unit 116 can process one or more images of the data 110 in aggregate or process each image of the data 110 individually. In some implementations, one or more components of the control unit 116 process items of the data individually and one or more components of the control unit 116 process the data 110 in aggregate. For example, the depth perception model 118 can process each image of the data 110 individually. The depth perception model 118 can generate depth-enhanced images and provide the images to the object detector 120 and the pose detector 122. The object detector 120 and the pose detector 122 can process the depth-enhanced images of the depth perception model 118 individually and provide data to the biomass engine 127.

In some implementations, the biomass engine 127 processes data from the depth perception model 118, the object detector 120, and the pose detector 122, individually. In general, processing individually as discussed herein, can include processing one or more items sequentially or in parallel using one or more processors. In some implementations, the decision engine 129 processes data in aggregate. For example, the decision engine 129 can determine, based on one or more data values indicating biomass estimates provided by the biomass engine 127, one or more decisions and related actions, as described herein. In general, processing in aggregate as discussed herein, can include processing data corresponding to two or more items of the data 110 to generate a single result. In some implementations, an item of the data 110 includes the image 112.

In some implementations, the object detector 120 includes one or more feature recognition algorithms. In some implementations, the object detector 120 includes one or more machine learning models trained to detect portions of animals, such as key points on a fish, cow, or other animal. For example, the object detector 120 can obtain a portion of the image 112 and detect the fish 113 and the fish 115. The object detector 120 can detect key points of the fish 113 and 115 such as a head, nose, fins, among others. The object detector 120 can be trained using labeled images of fish or other objects.

In some implementations, the object detector 120 generates bounding boxes around detected objects. For example, the object detector 120 can detect the fish 115 and generate a bounding box for the fish 115. The object detector 120 can similarly detect a key point on the fish 115 and store the location of the key point and provide the location as output to another component of the control unit 116. A bounding box for the fish 115 can indicate a position of the fish 115 within the image 112. Other bounding boxes can indicate positions of key points.

The control unit 116 provides output of the object detector 120 to the pose detector 122. The pose detector 122 determines a pose of the fish detected by the object detector 120. The pose detector 122 receives one or more object detections, such as key points on a fish, from the object detector 120. The pose detector 122 receives one or more object detections from images including the image 112 of the fish 113 and the fish 115. The pose detector 122 receives depth information from the depth perception model 118. The object detections and the depth information enable the pose detector 122 to estimate a pose of one or more detected fish in three dimensions (3D), such as the fish 113 or the fish 115.

Figure 3:
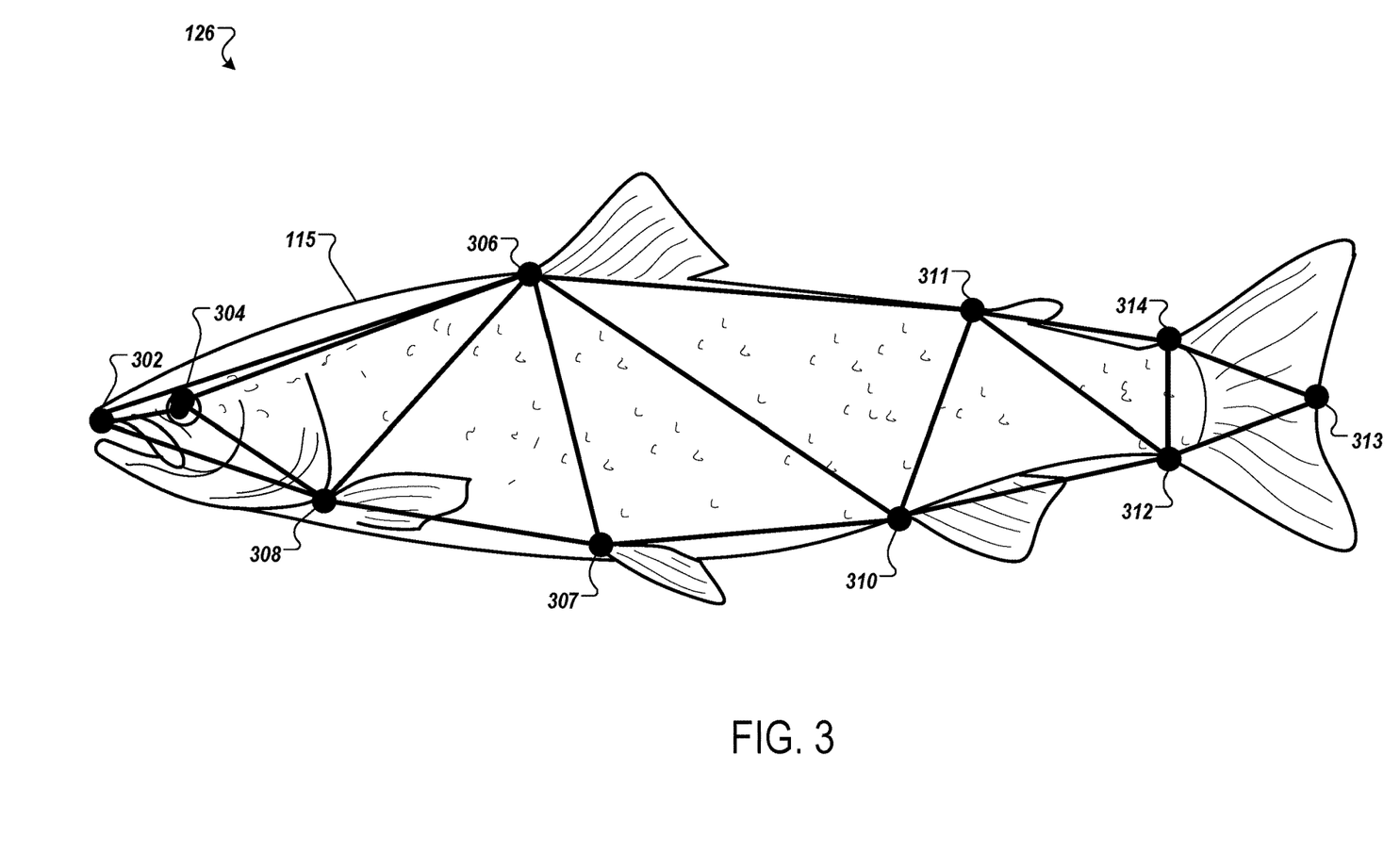
FIG. 3 is a diagram showing an example of a truss network.

In some implementations, the pose detector 122 includes a truss network generation module to generate truss networks for detected objects. For example, a truss network generation module can generate a truss network 126 for the fish 115. The truss network generation module can generate the truss network 126 based on the image 112, the output of the depth perception model 118, the output of the object detector 120, or the output of the pose detector 122. The truss network 126 is shown in FIG. 3.

The pose detector 122 is used to interpret distances between key points and thus determine truss lengths. For example, if the fish 115 is at a 15 degree angle from an imaginary line extending from the camera device 102, key points may appear close and thus truss lengths may appear to be of a small value compared to their true value. By using the pose detector 122, the 3D pose of the fish, including angle, is accounted for and accurate measurements of the fish 115 are made.

The control unit 116 provides output of the pose detector 122 to the biomass engine 127. The biomass engine 127 obtains the output of the pose detector 122. In some implementations, the biomass engine 127 includes one or more models trained to predict a biomass of a fish based on a truss network of a fish. For example, the control unit 116 can obtain ground truth data, similar to the depth training data 124, that includes one or more truss networks with corresponding known biomasses. The ground truth data can include a first truss network, with specific truss lengths, and a corresponding label indicating the known biomass of a fish from which the truss network was derived.

In training one or more models of the biomass engine 127, the control unit 116 can provide truss network data to the one or more models. The control unit 116 can obtain output of the one or more models indicating a predicted biomass based on the truss network data. The control unit 116 can compare the predicted biomass to the known biomass of the ground truth data and generate an error term. The control unit 116 can provide the error term to the one or more models or directly adjust one or more parameters of the one or more models based on the error term. In general, the one or more parameters can be adjusted to improve the accuracy of biomass estimations or reduce a difference value between the known biomass values of ground truth data and predicted values.

The biomass engine 127 generates biomass estimations of one or more fish based on the data provided by the pose detector 122. In the example of FIG. 1, the biomass engine 127 generates a biomass estimation for one or more fish in the fish pen 104, including the fish 113 and the fish 115. For example, the biomass engine 127 can generate a biomass estimation of 5 kilograms for the fish 113 and 8 kilograms for the fish 115 as shown in the example of FIG. 1. The biomass engine 128 can generate biomass estimation data 128 including a biomass estimation for the fish 113 and the fish 115. The biomass estimation data 128 can include one or more additional biomass estimations for one or more additional detected fish based on one or more additional images of the data 110 obtained by the control unit 116 and processed by the control unit 116.

In stage C, the control unit 116 determines an action based on the output, including the biomass estimation data 128, of the biomass engine 127. In some implementations, the control unit 116 provides output of the biomass engine 127, including one or more biomass estimation values, to the decision engine 129.

In some implementations, the decision engine 129 determines an action based on processing a single biomass estimation generated by the biomass engine 127. For example, the decision engine 129 can compare a single biomass estimation to a threshold. If the estimation satisfies the threshold, the decision engine 129 can determine an action based on the estimation satisfying the threshold.

In some implementations, the decision engine 129 determines an action based on processing two or more biomass estimations generated by the biomass engine 127. For example, the decision engine 129 can determine two or more biomass estimations satisfy one or more thresholds. In some implementations, the decision engine 129 determines a portion of the fish 106, based on data generated by the biomass engine 127, are below an expected weight or below weights of others of the fish 106. For example, the decision engine 129 can determine subpopulations within the fish 106 and determine one or more actions based on the determined subpopulations, such as actions to mitigate or correct for issues (e.g., runting, health issues, infections, disfiguration, among others). Actions can include feed adjustment, sorting, model training, and user report feedback, among others.

In some implementations, the output of the biomass engine 127 includes one or more biomass distributions. For example, the biomass engine 127 can provide biomass estimation for multiple fish. The decision engine 129 can detect one or more features of the biomass estimations. For example, the decision engine 129 can detect one or more subpopulations. Subpopulations can include runt fish, healthy fish, diseased fish, among others.

In some implementations, the decision engine 129 detects a runt subpopulation based on processing, the output of the biomass engine 127. For example, the decision engine 129 can include one or more algorithms or trained models to detect groups within a distribution of data. The decision engine 129 can include one or more processors configured to perform clustering algorithms such as k-mean, partitioning methods, hierarchical clustering, fuzzy clustering, density-based clustering, model-based clustering, among others.

In some implementations, the control unit 116 determines an adjustment of feed using the feed controller unit 130 controlling the feed system 132. The control unit 116 can provide the output of the biomass engine 127 or a control signal to the feed controller unit 130. Depending on the data received from the control unit 116, the feed controller unit 130 can either process the output of the biomass engine 127 to determine an adjustment of feed and provide a control signal to the feed system 132 or can provide the control signal provided by the control unit 116 to the feed system 132.

In some implementations, the decision engine 129 does not detect a runt subpopulation. For example, the decision engine 129 can detect a biomass distribution from the output of the biomass engine 127 that does or does not satisfy a biomass requirement or threshold, such as a biomass requirement for distribution or sale. The decision engine 129 can determine, based on features of the biomass distribution, what action to perform.

For example, if one or more biomass estimations generated by the biomass engine 127 do not satisfy a threshold (e.g., the mean or median biomass is too large or too small), the control unit 116 can provide a control signal to a sorting actuator of a sorting system to sort one or more fish from the fish 106 or can provide a control signal to adjust a feeding of the fish 106. For example, the control unit 116 can sort the fish 106 based on biomass. The control unit 116 can send a signal to a sorting system that sorts fish based on one or more criteria, such as a threshold biomass, into multiple locations based on the one or more criteria.

In some implementations, the control unit 116 includes the feed controller unit 130. For example, the control unit 116 may control both the processing of the images in the data 110 and the adjustments to the feeding by controlling the feed system 132.

In some implementations, the control unit 116 adjusts feeding to provide feed to a certain area of the fish pen 104. For example, the obtained data 110 can include positions of the fish detected within the images of the obtained data 110. The control unit 116 can determine based on one or more subpopulations detected by the decision engine 129 of the control unit 116 that a given subpopulation requires additional feed.

The control unit 116 can send a control signal to the feed system 132 or to the control unit 130 for the feed system 132 configured to adjust the location of an output of feed. The control unit 116 can adjust the location of an output of feed to a location of one or more fish within a particular subpopulation or an average location of the subpopulation.

In some implementations, the feed system 132 includes multiple food types. For example, the controller unit 130 can provide control messages to the feed system 132 to change the food type provided to the fish 106. In some cases, the multiple food types include a medicated food type and a non-medicated food type. In some cases, the multiple food types include food with a particular nutritional value and food with a different nutritional value.

The controller unit 130 can determine, based on data from the control unit 116, which food to provide to the fish 106, how much food to provide, when to provide the food, and at what rate to provide the food. In general, the controller unit 130 can generate a meal plan based on data from the control unit 116, such as biomass estimations or a control signal generated based on biomass estimations, where the meal plan includes one or more of: a feed type, a feed rate, a feed time, and a feed amount.

In some implementations, the control unit 116 includes multiple computer processors. For example, the control unit 116 can include a first and a second computer processor communicably connected to one another. The first and the second computer processor can be connected by a wired or wireless connection. The first computer processor can perform one or more of the operations of the depth perception model 118, the object detector 120, the pose detector 122, the biomass engine 127, or the decision engine 129. The first computer processor can store or provide the depth training data 124.

Similarly, the second computer processor can perform one or more of the operations of the depth perception model 118, the object detector 120, the pose detector 122, the biomass engine 127, or the decision engine 129. The second computer processor can store or provide the depth training data 124. Operations not performed by the first computer processor can be performed by the second computer processor or an additional computer processor. Operations not performed by the second computer processor can be performed by the first computer processor or an additional computer processor.

In some implementations, the control unit 116 operates one or more processing components, such as the depth perception model 118, the object detector 120, the pose detector 122, the biomass engine 127, or the decision engine 129. In some implementations, the control unit 116 communicates with an external processor that operates one or more of the processing components. The control unit 116 can store the depth training data 124, or other data used to train one or more models of the processing components, or can communicate with an external storage device that stores data including the depth training data 124.

In some implementations, the biomass engine 127 generates, for each fish and across multiple weight ranges, the likelihood that the fish's weight is within a given weight range. The collection of likelihoods for each weight range corresponding to a fish can be represented as a distribution. For example, weight ranges for a given biomass distribution may include ranges from 3 to 3.1 kilograms (kg), 3.1 to 3.2 kg, and 3.2 to 3.3 kg. A likelihood that the actual biomass of the fish 113 is within the first range, 3 to 3.1 kg, can be 10 percent. A likelihood that the biomass of the fish 113 is within the second or third range, 3.1 to 3.2 kg or 3.2 to 3.3 kg, respectively, can be 15 percent and 13 percent. In general, the sum of all likelihoods across all weight ranges can be normalized (e.g., equal to a value, such as 1, or percent such as 100 percent).

In some implementations, the weight ranges are indicated as values on an x axis of a distribution representation. For example, a Gaussian, or Gaussian-like form can indicate a likelihood, shown on the y axis, for each weight range across a range of weight ranges, shown on the x axis.

In some implementations, the biomass engine 127 generates a specific biomass for each fish. In some implementations, the biomass engine 127 generates a biomass distribution for each fish. Instead of generating a distribution, the biomass engine 127, including one or more trained models, can obtain the data 110, including image 112, and generate an indication of the most likely biomass based on the data. In some cases, truss length measurements can be used as input data. In other cases, the biomass engine 127 can simply generate biomass indications based on obtained images.

Figure 2:
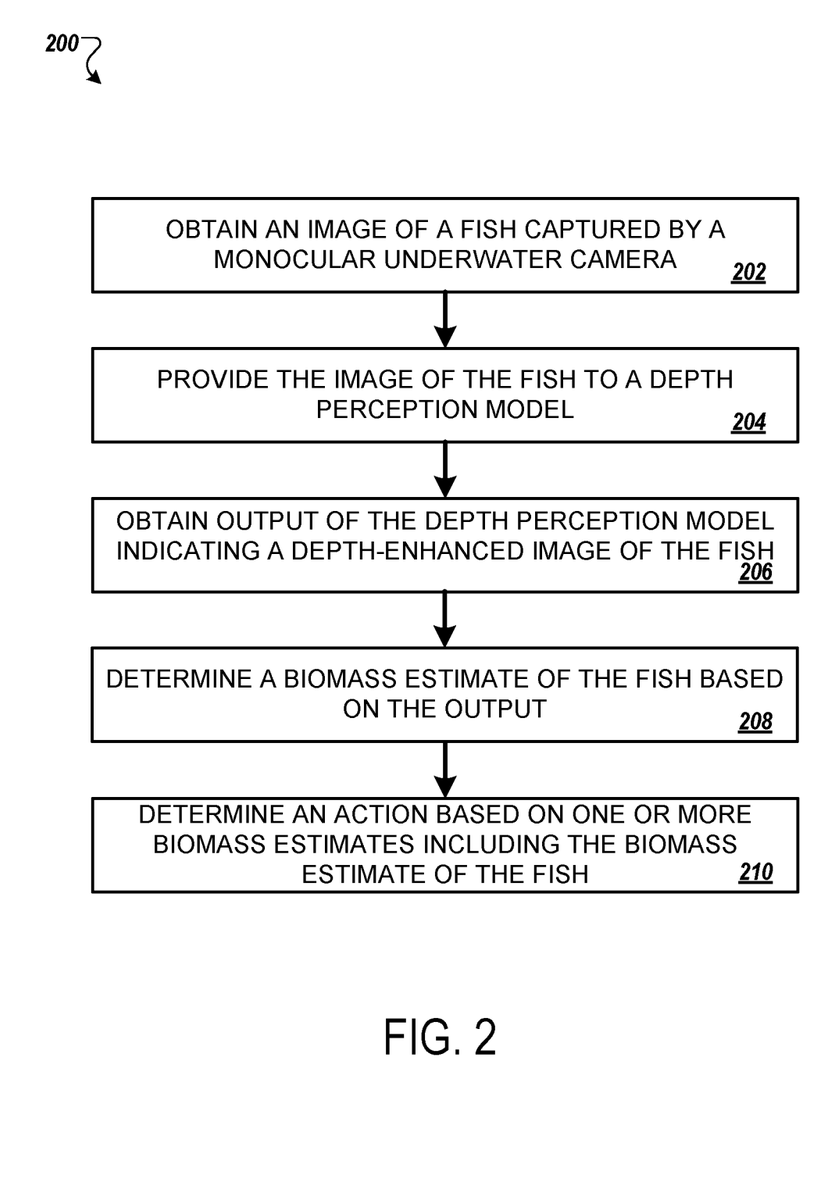
FIG. 2 is a flow diagram showing an example of a system for monocular underwater camera biomass estimation.

FIG. 2 is a flow diagram showing an example of a process 200 for monocular underwater camera biomass estimation. The process 200 may be performed by one or more systems, for example, the system 100 of FIG. 1.

The process 200 includes obtaining an image of a fish captured by a monocular underwater camera (202). For example, the control unit 116 can obtain the data 110 from the camera device 102. The data 110 can include the image 112. The image 112 can include a depiction of the fish 115. In some implementations, the control unit 116 obtains the data 110 from another device communicably connected to the camera device 102. For example, the camera device 102 can send the data 110 to one or more intermediary devices that provides the data 110 to the control unit 116.

The process 200 includes providing the image of the fish to a depth perception model (204). For example, the control unit 116 can provide the data 110 to the depth perception model 118. In some implementations, the process 200 includes obtaining data from the monocular underwater camera indicating a current operation status of the monocular underwater camera; and in response to obtaining the image of the fish and the data from the monocular underwater camera, the process 200 includes providing the image of the fish to the depth perception model. For example, the control unit 116 can determine, based on data obtained from the monocular underwater camera, whether or not to process the data 110 using the depth perception model 118.

The process 200 includes obtaining output of the depth perception model indicating a depth-enhanced image of the fish (206). For example, the control unit 116 can obtain output data from the depth perception model 118. The output can include a depth enhanced image of the fish 115. The output can include a depth enhanced image of objects depicted in the image 112, including the fish 113 and the fish 115. The output can include depth enhanced versions of one or more images of the data 110.

The process 200 includes determining a biomass estimate of the fish based on the output (208). For example, the control unit 116, or the depth perception model 118 directly, can provide depth-enhanced versions of one or more images to the object detector 120 and the pose detector 122. In some implementations, the pose detector 122 generates a truss network, such as the network 126, to the biomass engine 127.

In some implementations, the control unit 116 determines, based on a depth-enhanced image of a fish, a data set including a value that indicates a length between a first point on the fish and a second point on the fish. For example, the pose detector 122 of the control unit 116 can generate a truss network 126 as shown in FIG. 1 and FIG. 3 for the fish 115. The truss network 126 can include one or more values indicating one or more lengths between multiple points on the fish 115. The lengths can be determined for one or more objects detected by the object detector 120 and based on a pose detected by the pose detector 122. As discussed herein, the pose can greatly affect the accuracy of truss networks generated. The depth-enhanced version of images allow the control unit 116 to accurately generate truss networks for fish based on a three-dimensional pose of a given fish.

In some implementations, the control unit 116 provides a data set including a value that indicates a length between a first point on a fish and a second point on a fish to a model trained to predict biomass. For example, the biomass engine can include a model trained to predict biomass. The control unit 116 can obtain data from the pose detector 122, including a value that indicates a length between a first point on a fish and a second point on the fish, and provide the data to the biomass engine 127.

In some implementations, the control unit 116 obtains output of a model trained to predict biomass as the biomass value of the fish. For example, the control unit 116 can obtain output of the biomass engine 127, such as the estimation data 128. The control unit 116 can provide the output to the decision engine 129.

In some implementations, the control unit 116 detects a first point and a second point on a fish. For example, the object detector 120 can include one or more feature detectors, including a feature detector for particular features of a fish including key points, such as eyes, fins, nose, among others. In some implementations, the control unit 116 provides a depth-enhanced image of, a fish to a model trained to detect feature points on a fish body. For example, the object detector 120 can include one or more trained models. A model of the one or more models can be trained with data that includes labeled features of fish. The model can provide predicted features of fish based on input images of fish. The control unit 116 or the model itself can adjust one or more parameters of the model based on a comparison between the known features provided by the labels of the training data and the predicted features of fish provided by the model during training.

In some implementations, the control unit 116 detects fish within an image using a model trained to detect fish. For example, the object detector 120 can, include a model trained to detect fish, such as the fish 113 and the fish 115. The model can be trained with data that includes labeled fish within an image of one or more fish. The model can provide predicted fish detections, such as bounding boxes or other indications of locations and identifications of the detected fish, based on input, images of fish. The control unit 116 or the model itself can adjust one or more parameters of the model based on a comparison between the known features provided by the labels of the training data and predicted fish detections provided by the model during training.

The process 200 includes determining an action based on one or more biomass estimates including the biomass estimate of the fish (210). In some implementations, the action includes adjusting a feeding system providing feed to fish. For example, the control unit 116 can provide the output of the biomass engine 127 or a control signal to the feed controller unit 130. Depending on the data received from the control unit 116, the feed controller unit 130 can either process the output of the biomass engine 127 to determine an adjustment of feed and provide a control signal to the feed system 132 or can provide the control signal provided by the control unit 116 to the feed system 132.

In some implementations, the action includes sending data including the biomass estimate to a user device, where the data is configured to, when displayed on the user device, present a user of the user device with a visual representation of the biomass estimate. For example, the control unit 116 can generate a data signal that includes, an indication of one or more biomass estimates, such as the estimate data 128. In some implementations, the control unit 116 waits for feedback from a user provided a visual representation of a biomass estimate to confirm an action determined by the decision engine 129, such as a feed adjustment.

In some implementations, the control unit 116 obtains data from a monocular underwater camera indicating a current operation status of the monocular underwater camera and, in response to obtaining an image of a fish and the data from the monocular underwater camera, provides the image of the fish to a depth perception model. For example, the camera 102 may include a dysfunctional stereo camera pair. The dysfunction can result in images with the stereo effect provided depth data. To mitigate this situation, the camera device 102 can send a signal to the control unit 116 indicating a camera of a stereo pair is dysfunctional after the camera device 102 determines a camera of a stereo pair has become dysfunctional. In response to the signal, the control unit 116 can process images obtained from the camera device 102 using the depth perception model 118.

In some implementations, the control unit 116 determines, based on the data 110 or other data provided by the camera device 102, the images do not include depth data. For example, the control unit 116 can process the data 110 and determine that images lack a stereo feature. In response, the control unit 116 can provide the images to the depth perception model 118 to determine the missing depth data. The processing switch can be automatic such that, intermediate data processing issues or environmental effects, such as fish or debris obfuscating or blocking an image of a stereo pair, can be detected by the control unit 116 and the control unit 116 can determine to process corresponding images with the depth perception model 118 and can process the corresponding images with the depth perception model 118.

FIG. 3 is a diagram showing an example of a truss network 126. FIG. 3 shows truss lengths and key points computed for the fish 115 by the system 100 shown in FIG. 1. The truss lengths between key points are used to extract information about the fish including a weight of the fish. Various trusses, or lengths between key points, of the fish can be used. FIG. 3 shows a number of possible truss lengths including upper lip 302 to eye 304, upper lip 302 to leading edge dorsal fin 306, upper lip 302 to leading edge pectoral fin 308, leading edge dorsal fin 306 to leading edge anal fin 310, leading edge anal fin 310 to trailing low caudal peduncle 312, trailing lower caudal peduncle 312 to trailing upper caudal peduncle 314. Other key points and other separations, including permutations of key points mentioned, can be used. For different fish, or different species of fish, different key points may be generated. For any set of key points, a truss network may be generated as a model.

Other truss lengths not shown can be used by the system 100. For example, a truss length from the upper lip 302 to the tail 313 can be used as the length of the fish 115 and included in a collection of one or more truss length measurements and provided to the trained model 123 to generate a biomass distribution. In addition, specific truss lengths can be used to recognize specific deformities. Deformities such as shortened operculum can be detected using truss lengths such as a truss length from the upper lip 302 to the gill. Processing one or more images of a fish can include determining any of the following health conditions: shortened abdomen, shortened tail, scoliosis, lordosis, kyphosis, deformed upper jaw, deformed lower jaw, shortened operculum, runting or cardiomyopathy syndrome (CMS).

In some implementations, a biomass distribution includes health data related to one or more fish represented in a distribution. For example, the biomass engine 127 can generate a distribution of one or more fish that includes health probabilities as well as, or instead of, biomass data. The health probabilities can be used to determine various remedial actions including providing medicated feed or moving the fish to a system for treatment, such as delousing.

Figure 4:
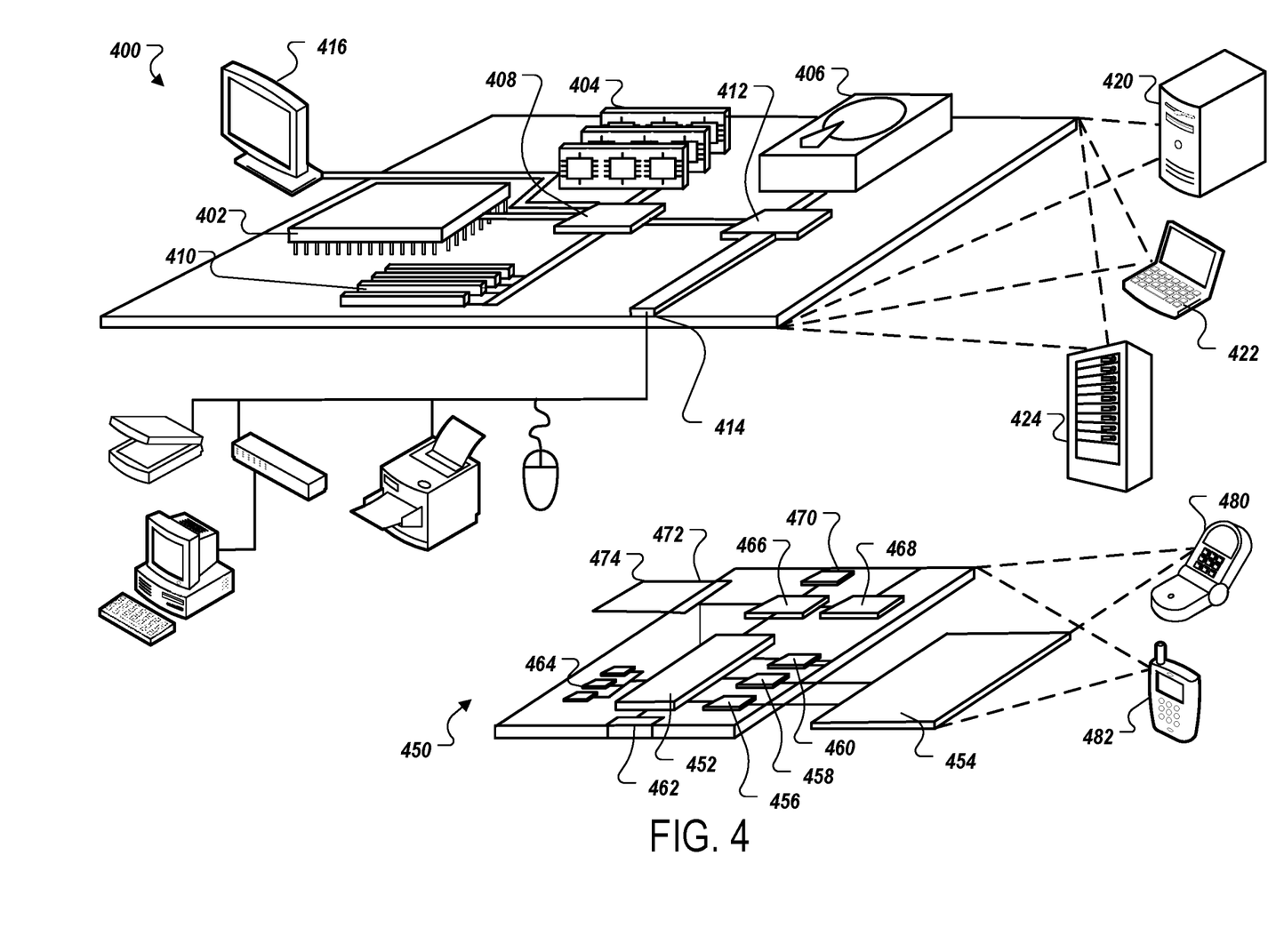
FIG. 4 is a diagram illustrating an example of a computing system used for monocular underwater camera biomass estimation.

FIG. 4 is a diagram illustrating an example of a computing system used for monocular underwater camera biomass estimation. The computing system includes computing device 400 and a mobile computing device 450 that can be used to implement the techniques described herein. For example, one or more components of the system 100 could be an example of the computing device 400 or the mobile computing device 450, such as a computer system implementing the control unit 116, devices that access information from the control unit 116, or a server that accesses or stores information regarding the operations performed by the control unit 116.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 402 is a single threaded processor. In some implementations, the processor 402 is a multi-threaded processor. In some implementations, the processor 402 is a quantum computer.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine readable mediums (for example, the memory 404, the storage device 406, or memory on the processor 402). The high-speed interface 408 manages bandwidth-intensive operations for the computing device 400, while the low-speed interface 412 manages lower bandwidth-intensive operations. Such allocation of functions is an example only. In some implementations, the high speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may include one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from, a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry in some cases. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 4G/6G cellular, among others. Such communication may occur, for example, through the transceiver 468 using a radio frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, among others) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that, the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
    obtaining an image of a fish captured by a monocular underwater camera;
    providing the image of the fish to a depth perception model;
    generating, by the depth perception model, an output including a depth-enhanced image of the fish;
    determining a biomass estimate of the fish based on the output depth-enhanced image of the fish; and
    performing an action based on one or more biomass estimates including the biomass estimate of the fish.

2. The method of claim 1, comprising:
    determining, based on the depth-enhanced image of the fish, a data set including a value that indicates a length between a first point on the fish and a second point on the fish.

3. The method of claim 2, wherein determining the biomass value of the fish comprises:
    providing the data set including the value that indicates the length between the first point on the fish and the second point on the fish to a model trained to predict biomass; and
    generating, by the model trained to predict biomass, an output including the biomass value of the fish.

4. The method of claim 2, comprising:
    detecting the first point and the second point on the fish.

5. The method of claim 4, wherein detecting the first and second points comprise:
    providing the depth-enhanced image of the fish to a model trained to detect feature points on a fish body.

6. The method of claim 1, comprising:
    detecting the fish within the image using a model trained to detect fish.

7. The method of claim 1, wherein the action comprises:
    adjusting a feeding system providing feed to the fish.

8. The method of claim 1, wherein the action comprises:
    sending data including the biomass estimate to a user device, wherein the data is configured to, when displayed on the user device, present a user of the user device with a visual representation of the biomass estimate.

9. The method of claim 1, comprising:
    obtaining data from the monocular underwater camera indicating a current operation status of the monocular underwater camera; and
    in response to obtaining the image of the fish and the data from the monocular underwater camera, providing the image of the fish to the depth perception model.

10. The method of claim 1, wherein determining the action comprises:
    determining to adjust a position or operation of an item of motorized equipment.

11. A non-transitory, computer-readable medium storing one or more instructions executable by a computer system to perform operations comprising:
    obtaining an image of a fish captured by a monocular underwater camera;

providing the image of the fish to a depth perception model;

generating, by the depth perception model, an output including a depth-enhanced image of the fish;

determining a biomass estimate of the fish based on the output depth-enhanced image of the fish; and performing an action based on one or more biomass estimates including the biomass estimate of the fish.

12. The non-transitory, computer-readable medium of claim 11, comprising:

determining, based on the depth-enhanced image of the fish, a data set including a value that indicates a length between a first point on the fish and a second point on the fish.

13. The non-transitory, computer-readable medium of claim 12, wherein determining the biomass value of the fish comprises:

providing the data set including the value that indicates the length between the first point on the fish and the second point on the fish to a model trained to predict biomass; and generating, by the model trained to predict biomass, an output including the biomass value of the fish.

14. The non-transitory, computer-readable medium of claim 12, comprising:

detecting the first point and the second point on the fish.

15. The non-transitory, computer-readable medium of claim 14, wherein detecting the first and second points comprise:

providing the depth-enhanced image of the fish to a model trained to detect feature points on a fish body.

16. The non-transitory, computer-readable medium of claim 11, comprising:

detecting the fish within the image using a model trained to detect fish.

17. The non-transitory, computer-readable medium of claim 11, wherein the action comprises:

adjusting a feeding system providing feed to the fish.

18. The non-transitory, computer-readable medium of claim 11, wherein the action comprises:

sending data including the biomass estimate to a user device, wherein the data is configured to, when displayed on the user device, present a user of the user device with a visual representation of the biomass estimate.

19. The non-transitory, computer-readable medium of claim 11, comprising:

obtaining data from the monocular underwater camera indicating a current operation status of the monocular underwater camera; and in response to obtaining the image of the fish and the data from the monocular underwater camera, providing the image of the fish to the depth perception model.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining an image of a fish captured by a monocular underwater camera;

providing the image of the fish to a depth perception model;

generating, by of the depth perception model, an output including a depth-enhanced image of the fish;

determining a biomass estimate of the fish based on the output depth-enhanced image of the fish; and performing an action based on one or more biomass estimates including the biomass estimate of the fish.

* * * * *

UNITED STATES PATENT AND TRADEMARK OFFICE
CERTIFICATE OF CORRECTION

PATENT NO. : 12,254,712 B2
APPLICATION NO. : 17/716797
DATED : March 18, 2025
INVENTOR(S) : Julia Black Ling and Laura Valentine Chrobak Page 1 of 1

It is certified that error appears in the above-identified patent and that said Letters Patent is hereby corrected as shown below:

On the Title Page

Column 1, item (73) (Assignee):
Delete "TidaIX" and insert -- TidalX --.

In the Claims

Column 20, Line 31, in Claim 20:
After "by" delete "of".

Signed and Sealed this
Sixth Day of May, 2025

Coke Morgan Stewart
*Acting Director of the United States Patent and Trademark Office*